(12) United States Patent
Minborg et al.

(10) Patent No.: US 11,514,009 B2
(45) Date of Patent: *Nov. 29, 2022

(54) METHOD AND SYSTEMS FOR MAPPING OBJECT ORIENTED/FUNCTIONAL LANGUAGES TO DATABASE LANGUAGES

(71) Applicant: Speedment, Inc., Palo Alto, CA (US)

(72) Inventors: Per-åke Minborg, Stora Höga (SE); Emil Forslund, Skövde (SE)

(73) Assignee: Speedment, Inc., Palo Alto, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 16/800,341

(22) Filed: Feb. 25, 2020

(65) Prior Publication Data
US 2020/0265028 A1    Aug. 20, 2020

Related U.S. Application Data

(63) Continuation of application No. 15/367,723, filed on Dec. 2, 2016, now Pat. No. 10,621,152.

(60) Provisional application No. 62/261,978, filed on Dec. 2, 2015.

(51) Int. Cl.
| | |
|---|---|
| *G06F 16/2453* | (2019.01) |
| *G06F 16/23* | (2019.01) |
| *G06F 8/51* | (2018.01) |
| *G06F 16/215* | (2019.01) |
| *G06F 16/2455* | (2019.01) |

(52) U.S. Cl.
CPC .............. *G06F 16/215* (2019.01); *G06F 8/51* (2013.01); *G06F 16/23* (2019.01); *G06F 16/24534* (2019.01); *G06F 16/24554* (2019.01)

(58) Field of Classification Search
CPC .......... G06F 16/215; G06F 8/51; G06F 16/23; G06F 16/24534; G06F 16/24554
USPC ......................................................... 707/692
See application file for complete search history.

(56) References Cited

U.S. PATENT DOCUMENTS

| | | | | |
|---|---|---|---|---|
| 5,485,618 A * | 1/1996 | Smith | .................. | G06F 8/33 715/710 |
| 5,966,539 A * | 10/1999 | Srivastava | ............ | G06F 8/4435 717/160 |
| 6,629,313 B1 * | 9/2003 | Rowe | ........................ | G06F 8/41 707/999.003 |
| 6,889,227 B1 * | 5/2005 | Hamilton | ............... | G06F 16/252 |
| 6,912,539 B1 * | 6/2005 | Kapitanski | ............ | G06F 16/258 707/683 |
| 7,600,074 B2 * | 10/2009 | Zhou | ..................... | G06F 3/0613 711/112 |
| 9,367,806 B1 * | 6/2016 | Cosic | .................. | G06F 16/2379 |
| 10,621,152 B2 * | 4/2020 | Minborg | ................. | G06F 16/23 |
| 2006/0282470 A1 * | 12/2006 | Yu | ......................... | G06F 16/288 |

(Continued)

OTHER PUBLICATIONS

Ordonez, C., "Data set preprocessing and transformation in a database system", Intelligent Data Analysis 15 (2011): pp. 613-631, IOS Press, 2011. (Year: 2011).*

*Primary Examiner* — Phuong Thao Cao
(74) *Attorney, Agent, or Firm* — Goodwin Procter LLP

(57) ABSTRACT

In a pipeline of operations having a terminating operation and a source operation, a builder is built corresponding to the terminating operation. The builder may also correspond to one or more intermediate operations. A database query is generated corresponding to the builder and is sent to a database or a data source for efficient access to the database.

20 Claims, 25 Drawing Sheets

(56) References Cited

U.S. PATENT DOCUMENTS

| | | | |
|---|---|---|---|
| 2008/0046479 A1* | 2/2008 | Pareek | G06F 16/2358 |
| 2013/0152058 A1* | 6/2013 | Schmuck | G06F 8/40 |
| | | | 717/137 |
| 2017/0139682 A1* | 5/2017 | Dravnieks | G06F 9/30 |
| 2017/0161307 A1* | 6/2017 | Minborg | G06F 16/23 |
| 2018/0011905 A1* | 1/2018 | Liu | G06F 16/2433 |

\* cited by examiner

Figure 19

| |
|---|
| Update(Join(item, user)) |
| On(item.id, user.item) |
| Set(item.price, INCREASE, 20) |
| Where(item.price, LESS_THAN, 100) |
| Where(user.id, GREATER_THAN, 1000) |

```
UPDATE `item` JOIN `user`
ON `item`.`id` = `user`.`item`
          SET
`item`.`price` = `item`.`price` + 20
         WHERE
  `item`.`price` < 100 AND
    `user`.`id` > 1000;
```

Figure 20A

Table 1

| # | Pipeline | SQL* |
|---|---|---|
| 1 | `users.stream()`<br>`    .filter(User.ID.equal(10))` | `SELECT * FROM `user``<br>`WHERE `id` = 10;` |
| 2 | `users.stream()`<br>`    .mapToInt(User::getId)` | `SELECT `id` FROM `user`;` |
| 3 | `users.stream()`<br>`    .filter(User.ID.greaterThan(4))`<br>`    .mapToInt(User::getId)` | `SELECT `id` FROM `user``<br>`WHERE `id` > 4;` |
| 4 | `users.stream()`<br>`    .filter(User.ID.greaterThan(4))`<br>`    .mapToInt(User::getId)`<br>`    .skip(3).limit(10)` | `SELECT `id` FROM `user``<br>`WHERE `id` > 4`<br>`LIMIT 3, 10;` |
| 5 | `users.stream()`<br>`    .filter(User.ID.greaterThan(4))`<br>`    .sort(`<br>`        comparing(User::getId)`<br>`            .reversed()`<br>`    )`<br>`    .map(User::getId)`<br>`    .skip(3).limit(10)` | `SELECT `id` FROM `user``<br>`WHERE `id` > 4`<br>`ORDER BY `id` DESC`<br>`LIMIT 3, 10;` |
| 6 | `users.stream()`<br>`    .filter(User.ID.greaterThan(4))`<br>`    .sort(`<br>`        comparing(User::getAge)`<br>`            .reversed()`<br>`            .thenComparing(`<br>`                User::getName`<br>`            )`<br>`    )` | `SELECT * FROM `user``<br>`WHERE `id` > 4`<br>`ORDER BY `age` DESC, `name`;` |
| 7 | `long count = users.stream()`<br>`    .filter(User.ID.greaterThan(4))`<br>`    .count();` | `SELECT COUNT(`id`) as 'count'`<br>`FROM `user``<br>`WHERE `id` > 4;` |
| 8 | `users.stream()`<br>`    .map(User::getName)`<br>`    .map(String::toUpperCase)`<br>`    .min(naturalOrder());` | `SELECT UPPER(`name`) AS n`<br>`FROM `user` ORDER BY n`<br>`LIMIT 1;` |
| 9 | `users.stream()`<br>`    .mapToInt(User::getAge)`<br>`    .average();` | `SELECT AVG(`age`) FROM `user`;` |
| 10 | `users.stream()`<br>`    .mapToInt(User::getAge)`<br>`    .summaryStatistics();` | `SELECT`<br>`    MIN(`age`) AS 'min',`<br>`    MAX(`age`) AS 'max',`<br>`    COUNT(`age`) AS 'count',`<br>`    SUM(`age`) AS 'sum'`<br>`FROM `user`;` |

Figure 20B

| | | |
|---|---|---|
| 11 | ```
users.stream()
    .filter(User.ID.greaterThan(4))
    .map(User::getName)
    .distinct()
    .count();
``` | ```
SELECT COUNT(DISTINCT(`name`))
FROM `user`
WHERE `user`.`id` > 4;
``` |
| 12 | ```
users.stream()
    .anyMatch(User.ID.greaterThan(4));
``` | ```
SELECT COUNT(*)
AS 'anyMatch' FROM (
    SELECT `id` FROM `user`
    WHERE `id` > 4 LIMIT 1
);
``` |
| 13 | ```
users.stream()
    .noneMatch(User.ID.greaterThan(4));
``` | ```
SELECT 1 - COUNT(*)
AS 'noneMatch' FROM (
    SELECT `id` FROM `user`
    WHERE `id` > 4 LIMIT 1
);
``` |
| 14 | ```
users.stream()
    .allMatch(User.ID.greaterThan(4));
``` | ```
SELECT COUNT(`id`) = SUM(`id` > 4)
AS 'allMatch' FROM `user`;
``` |
| 15 | ```
users.stream()
    .filter(User.ID.greaterThan(4))
    .sort(comparing(User::getId)
    .findFirst();
``` | ```
SELECT * FROM `user`
WHERE `id` > 4 ORDER BY id LIMIT 1;
``` |
| 16 | ```
users.stream()
    .filter(User.ID.greaterThan(4))
    .sort(comparing(User::getId))
    .findAny();
``` | ```
SELECT * FROM `user`
WHERE `id` > 4 LIMIT 1;
``` |
| 17 | ```
int sumAge = users.stream().
    .filter(User.ID.greaterThan(4))
    .collect(
        summingInt(User::getAge)
    );
``` | ```
SELECT SUM(`age`) AS `sum`
FROM `user`
WHERE `id` > 4;
``` |
| 18 | ```
Map<Integer, List<User>> byAge =
users.stream()
    .filter(User.ID.greaterThan(4))
    .collect(
        groupingBy(User::getAge)
    );
``` | ```
SELECT *, `user` AS
`_groupingKey0` FROM `user`
WHERE `id` > 4;
``` |
| 19 | ```
Map<Integer, Integer> totalByAge =
users.stream()
    .filter(User.ID.greaterThan(4))
    .collect(
        groupingBy(
            User::getAge,
            summingInt(
                User::getAge
            )
        )
    );
``` | ```
SELECT
    age AS `_groupingKey0`,
    sum(age) AS `sum`
FROM `user`
WHERE `id` > 4
GROUP BY `age`;
``` |
| 20 | ```
Map<Boolean, List<User>> youngOld =
    users.stream()
        .collect(
            partitioningBy(
                User.AGE.greaterThan(4)
``` | ```
SELECT
    *,
    `age`>5 AS `_partitionKey0`
``` |

Figure 20C

| | | |
|---|---|---|
| | `    )`<br>`);` | `FROM \`user\``<br>`WHERE \`id\` > 4;` |
| 21 | `Map<User, List<Item>> itemsByUser =`<br>`    users.stream()`<br>`        .filter(User.ID.greaterThan(4))`<br>`        .flatMap(User::findItems)`<br>`        .collect(`<br>`            groupingBy(Item::findUser)`<br>`);` | `select \`user\`.*, \`item\`.*`<br>`from item`<br>`JOIN \`user\``<br>`ON`<br>`\`item\`.\`user\` = \`user\`.\`id\``<br>`WHERE`<br>`\`user\`.\`id\` > 4;` |

Figure 21

Table 2

| # | Pipeline | SQL* |
|---|---|---|
| 101 | users.stream()<br>    .filter(User.ID.greaterThan(4))<br>    .map(User.ID.adder(100))<br>    .forEach(User::persist); | INSERT INTO `user` (id, name, age) SELECT<br>`id`+100, `name`, `age`<br>FROM<br>`user` WHERE `id` > 4; |
| 102 | users.newInstance()<br>    .setId(10)<br>    .setName("Ann")<br>    .setAge(50)<br>    .persist(); | INSERT<br>    (id, name, age)<br>VALUES<br>    (10, 'Ann', 50); |
| 103 | createNewUsers().stream()<br>    .forEach(Users::persist); | INSERT<br>    (id, name, age)<br>VALUES<br>    (10, 'Ann', 50),<br>    (11, 'Bea', 51),<br>    (12, 'Cea', 52); |

Figure 22

Table 3

| # | Pipeline | SQL* |
|---|---|---|
| 201 | ```
users.stream()
    .filter(User.ID.greaterThan(4))
    .map(User.AGE.set(10))
    .forEach(User::update);
``` | ```
UPDATE `user`
SET `age` = 10
WHERE `id` > 4;
``` |
| 202 | ```
users.stream()
    .filter(User.ID.greaterThan(4))
    .map(User.AGE.adder(1))
    .forEach(User::update);
``` | ```
UPDATE `user`
SET `age` = `age` + 1
WHERE `id` > 4;
``` |
| 203 | ```
users.stream()
    .filter(User.ID.equal(4))
    .flatMap(User::findItems)
    .map(Item.PRICE.subtracter(1))
    .forEach(Item::update);
``` | ```
UPDATE `item`
JOIN `user`
ON
`item`.`user` = `user`.`id`
SET `price` = `price` - 1
WHERE
`user`.`id` = 4;
``` |

Figure 23

Table 4

| # | Pipeline | SQL* |
|---|---|---|
| 301 | `users.stream()`<br>`    .filter(User.ID.greaterThan(4))`<br>`    .forEach(User::delete);` | `DELETE FROM `user``<br>`WHERE `id` > 4;` |
| 302 | `users.stream()`<br>`    .filter(User.ID.equal(4))`<br>`    .flatMap(User::findItems)`<br>`    .forEach(Item::delete);` | `DELETE _deleted`<br>`FROM `item` AS _deleted`<br>`JOIN `user` AS _joinedUser`<br>`ON`<br>`_deleted.`user` = _joinedUser.`id``<br>`WHERE`<br>`_joinedUser.`id` = 4;` |

METHOD AND SYSTEMS FOR MAPPING OBJECT ORIENTED/FUNCTIONAL LANGUAGES TO DATABASE LANGUAGES

CROSS-REFERENCE TO RELATED APPLICATIONS

This application is a continuation of U.S. patent application Ser. No. 15/367,723, filed on Dec. 2, 2016, issued as U.S. Pat. No. 10,621,152, which claims priority to and the benefit of U.S. Provisional Patent Application No. 62/261,978, entitled "Method and Apparatus for Mapping Object Oriented/Functional Languages to Database Languages," filed on Dec. 2, 2015, the entire contents of each of which are incorporated herein by reference.

FIELD OF THE INVENTION

This disclosure generally relates to methods and apparatus for exchange of messages in a communication network. More specifically, various embodiments relate to a communication system, which connects to a private or public data communication network (such as the Internet) and allows applications to retrieve, update and/or delete digital objects (such as database objects) in a manner adapted to modern programming languages.

BACKGROUND OF THE INVENTION

Numerous information providers are present on communication networks (such as the Internet) providing all kinds of services. Many organizations have mission critical data in databases such as SQL databases or NoSQL databases. The size of those databases tend to vastly increase each year and at the same time the number of served transactions grow at an accelerating rate, according to an even steeper curve. Furthermore, the complexity of the database and its relations often deepens. By the increase of interactivity and the rising number of users (e.g. Internet users), there is an ever increasing demand for more database capacity and capabilities. However, currently, existing solutions have several drawbacks including their lack of performance.

Many larger organizations are challenged to maintaining existing or delivering higher levels of database performances. For example, organizations often have numerous legacy tools and applications which communicate with SQL databases. Adding to this are multiple third-party applications available for direct SQL usage. As a result, from a technical perspective, it is neither desirable nor feasible for some organizations to deploy other databases than SQL. However, the SQL standard is relatively old and does not support an object oriented and/or functional programming approach. The performance may at times be limited by the row oriented approach employed by SQL as well as the dynamic relation of information elements that often take place upon the request of information elements.

Capacity and performance are key factors when it comes to organizations' bottom-line. Slow web sites or poorly executed queries often result in less traffic, dissatisfied customers or a negative user experience, therefore ultimately hurting the bottom-line. The problem is universal regardless of the type of industry such as retail, finance, insurance, government, gaming, health-care. Organizations in these industries will sooner or later face the problem as competition leaps ahead.

IT departments face the problems in multiple ways: external web sites, internal databases or complex relationship queries. For example, to keep database demand under control, IT departments are forced to increase database capacity by deploying more powerful servers. Sometimes the cost for database licenses increase linearly with the number of CPUs used.

Application developers are facing a number of problems when they handle digital objects in data sources. For example, application providers need to write code manually that reflects objects stored in data sources. They often need to write communication adapters to convert from the underlying data sources to modern program languages objects/functional and programming paradigms.

Recently, functional programming models have been added to object oriented languages (such as the Java programming language). These functional additions make it possible for application developers to express what they want to do and not so much how it is done. However, the programming model for many databases (for example SQL databases) is fundamentally different from any functional view and so there is no obvious mapping from the functional view to the programming models used by many databases.

Applicants have identified that there are several problems in the present way of handling objects and functions in a communication network, searching for, inserting, changing or deleting specific digital objects and subsequently obtaining them because of several reasons described above and hereunder. In view of the foregoing, it may be understood that there are significant problems and shortcomings associated with existing approaches for obtaining and storing digital objects.

SUMMARY OF THE INVENTION

Several novel solutions have been devised to overcome various problems. Method and apparatus for mapping object oriented/functional languages to database languages are disclosed whereby application developer can remain in an object oriented and/or functional programming model while still accessing content in databases such as SQL databases or NoSQL databases, the later using a fundamentally different programing model.

Various embodiments further allow for seamless acceleration of database access using proxy objects or proxy representations of information objects in said database(s). The proxy objects/representations may be in the form of cached data. The Application Programming Interface (API) may be independent of where and when data is accessed. In some embodiments, data access can be made over 100 times faster than using ordinary database access schemes. In other embodiments, data access can be made 10,000 times faster than using ordinary database schemes.

According to some embodiments, an application may directly obtain digital objects from an in-memory store rather than querying a possibly remote data source. In some embodiments, several in-memory nodes are deployed simultaneously. This allows capacity to be scaled almost linearly while at the same time it provides for redundancy should one or several in-memory stores become unavailable. Some embodiments can accelerate an organizations' databases while still retaining the actual data in the existing databases (e.g., SQL databases). Furthermore, several embodiments utilize modern programming language paradigms and can automatically generate error-free code by using the underlying databases' definitions.

One technical effect of the systems and methods described herein is that they facilitate more efficient database access and can improve the performance and user experience of Internet or web applications. Another technical effect of the systems and methods described herein lies in improved database management including automated generation of database code.

Some embodiments have been successfully deployed on a variety of platforms ranging from large server clusters down to small embedded servers with very limited memory and CPU performance (e.g. Raspberry Pi). In small server deployments with very limited resources available, some of the embodiments described herein can make the difference between success and failure.

The various embodiments are in no way limited to the Internet or its current state. All the methods and apparatus may be applied in other data communication networks facilitating communication between two or more distinct locations as well as internal communication within a single node. In some embodiments, Java streams are mapped to SQL commands so that application developers can continue to use their object/functional oriented paradigm while communicating with a SQL database.

Accordingly, in one aspect a method is provided for translating a sequence of operations described using a generalized programming language into one or more database access commands in a database access language. The method includes generating an initial builder that corresponds to an original terminating operation in the sequence of operations. The initial builder includes an initial database access command corresponding to the original terminating operation. The method also includes determining whether a first intermediate operation in the sequence is translatable into a modified database access command that corresponds to both the initial database access command and the first intermediate operation.

In addition, the method includes updating the initial builder if the first intermediate operation is translatable. The updating includes modifying the initial database access command according to the first intermediate operation, into a modified database access command. If the first intermediate operation is determined not to be translatable, the method includes partitioning the sequence of operations into a first subsequence that includes the original terminating operation, and a second subsequence that includes the intermediate operation designated as a new terminating operation, and upstream operations, if any. The method may include updating the sequence of operations by removing therefrom the first intermediate operation.

In some embodiments, the first intermediate operation is determined to be not translatable, and the method further includes generating a new builder corresponding to the new terminating operation. The new builder may include a new initial database access command corresponding to the new terminating operation. The method may also include determining whether another intermediate operation, e.g., an intermediate operation in the second subsequence is translatable into a new modified database access command that corresponds to both the new initial database access command and the intermediate operation in the second subsequence.

If it is determined according to the method that the intermediate operation in the second subsequence is translatable, the method may include updating the new builder by modifying the new initial database access command according to the intermediate operation in the second subsequence, into a new modified database access command. Otherwise, the method may include partitioning the second subsequence into a first sub-subsequence that includes the new terminating operation, and a second sub-subsequence that includes the intermediate operation in the second subsequence, which may be designated as another terminating operation. The method may further include configuring an output of the new builder as a source to a query corresponding to the initial builder. Additionally or in the alternative, the method may include sending a query corresponding to the new builder to a database.

In some embodiments, the method includes determining that a second intermediate operation in the sequence of operations is translatable into a further modified database access command that corresponds to the modified database access command and the second intermediate operation. As discussed above, the modified database access command may correspond to the initial database access command and the first intermediate operation. The method may also include updating the initial builder by further modifying the modified database access command according to the second intermediate operation, into a further modified database access command.

In some embodiments the method includes determining that a source of the sequence is reached, and sending a query corresponding to the initial builder to a database. The database may include a structured query language (SQL) database and/or a non-structured query language (NoSQL) database. The initial builder may include one or more of an insert builder, an update builder, a delete builder, and a select builder. In some embodiments, the first intermediate operation includes a mapping of a first database element (e.g., a table, a set, a vector, a data structure, an array, a list, etc.) onto a second database element (e.g., another table, a set, a vector, a data structure, an array, a list, etc.). The modified database access command may include a command, sub-command, or a command modification of type join that is associated with both the first and second database elements.

The first intermediate operation may include a filtering of a first database element based on a condition, and the modified database access command may include a selection of a subset of records of the first database element based on the condition. In some embodiments the first intermediate operation includes updating a first database element according to a parameter, and the modified database access command may include a modification of at least a part of a record of the first database element according to the parameter. Updating the first database element may include adding a new record to the first database element, and the modification of at least a part of the record of the first database element may include inserting the new record into the first database element. A number of records to be transferred from a database to a processor that is adapted to execute the sequence of operations without using the database access command based on a builder (e.g., the initial builder, a new builder, etc.) may be greater than a number of records accessed via the initial database access command, and/or additional database accesses commands associated with one or more newly created builders.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to translate a sequence of operations described using a generalized programming language into one or more database access commands in a database access language. To this end, the instructions program the processing unit to: generate an initial builder that corresponds to an original terminating operation in the sequence of operations. The initial builder includes an initial database access command corresponding to the original terminating operation. The instructions also program the processing unit to determine whether a first intermediate operation in the sequence is translatable into a modified database access command that corresponds to both the initial database access command and the first intermediate operation.

In addition, the instructions program the processing unit to update the initial builder if the first intermediate operation is translatable. To that end, the instructions program the processing unit to modify the initial database access command according to the first intermediate operation, into a modified database access command. The instructions also program the processing unit, if the first intermediate operation is determined not to be translatable, to partition the sequence of operations into a first subsequence that includes the original terminating operation, and a second subsequence that includes the intermediate operation designated as a new terminating operation, and upstream operations, if any. In various embodiments, the instructions can program the processing unit to perform one or more of the method steps described above.

Various embodiments will now be described in more detail with reference to the accompanying drawings. It should be understood that different aspects of the present invention are not limited to these embodiments. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 19 illustrates a way of rendering a builder to SQL code, according to some embodiments.

FIGS. 20A-20C show Table 1 which illustrates mappings that can be done when selecting items from a SQL database, according to some embodiments.

FIG. 21 shows Table 2 which illustrates mappings that can be done when inserting items in a SQL database, according to some embodiments.

FIG. 22 shows Table 3 which illustrates mappings that can be done when updating items in a SQL database, according to some embodiments.

FIG. 23 shows Table 4 which illustrates mappings that can be done when removing items from a SQL database, according to some embodiments.

DETAILED DESCRIPTION OF THE INVENTION

Figure 1:
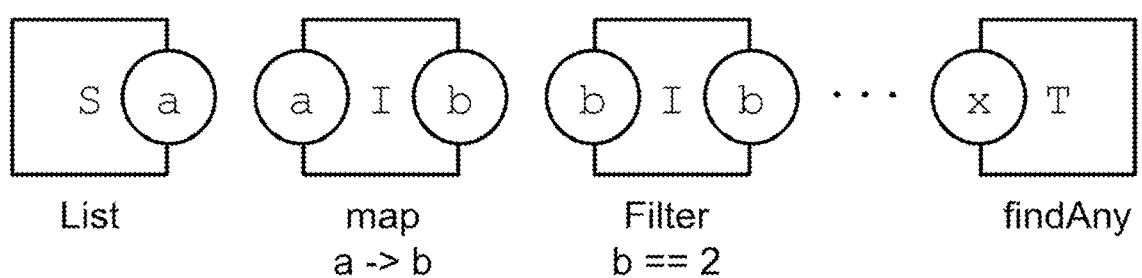
FIG. 1 illustrates a state of the art communication system where a list of operations on a data source will produce a result.

In order to simplify the description below, the disclosure herein refers to data stores in general and uses Structured Query Language (SQL) databases as examples. A data store is typically an application that enables storage and retrieval of digital objects including but not limited to SQL databases, Wide Column Store, Column Families, Document Store, Key/Value Store, Tuple Store, Graph Databases, Multi Model Databases, Object Databases, Grid and Cloud Databases, XML Databases, Multidimensional Databases, Multi-value Databases, NoSQL databases, XML files, and/or Spread Sheet and files. An SQL database can be any database partially or fully complying with any of the Structured Query Language (SQL) standards. Commonly used SQL-databases such as Apache Derby™, Amazon Aurora™, IBM DB2™, Hadoop™, SAP Sybase IQ™, etc. are within the scope of various embodiments. It should be understood that the databases stated herein are only a few examples and that various other databases are within the scope of various embodiments. It should also be noted that various embodiments are not restricted to just SQL databases. Additionally or in the alternative, some embodiments may connect to or be implemented for a number of different data sources and applications accessing such data sources. Those skilled in the art of programming and databases will generally understand how code for one database type may be written for another database type.

Additionally or in the alternative, some embodiments can also be used for NoSQL database types, including, but not limited to; MongoDB, Cassandra, Riak, Oracle NoSQL Database, Neo4J, Hazelcast, MonetDB, Hadoop, Hadoop/HBase.

Below, the terms "set" and "subset" are used. A set is a collection of objects. A set can be empty. A set A is said to be empty if it does not contain any objects. In the following, a set B is a subset of a set C if B is "contained" inside C. B and C may coincide.

In the following several examples will be depicted. The examples are shown in the programming language Java but various embodiments are in no way limited to this particular programming language. In fact, many other programming languages including, but not limited to; Ada, BASIC, C, C++, C#, Clojure, D, Erlang, Haskel, Java Script, Kotlin, PHP, Visual BASIC, and/or any other programming language, may be used to implement different embodiments. Those skilled in the art of programming will generally understand how code in one programming language may be written in another programming language.

In the following, several methods will be disclosed that translates from an object oriented/functional view and/or pipeline to SQL. There are numerous combinations of examples that could be shown. Here, only a small subset of those possible examples will be shown. This should not limit the scope of various embodiments, however. Those skilled in the art should generally understand that other examples can be used, as well.

This patent application is related to U.S. Patent Application Publication No. 2014/0149365, "Method and Apparatus for Handling Digital Objects in a Communication Network" which claims priority to U.S. Provisional Patent Application No. 61/410,201 filed on Nov. 4, 2010. The entire disclosure of each of which is incorporated herein by reference in its entirety.

Introduction

A serial computer program can be seen as a list of operations on a set of source data that will produce a single result. At the beginning of this pipeline of operations there is a source and at the end there is a terminal operation. Between these are a series of intermediate operations. These can for an example be be filters that excludes some elements from the pipeline, mappers that transforms the data from one type to another, flattening mappings that replaces each element with a series of inner elements, sorters that changes the order of the elements or reductions that merges multiple elements into one single element of data. There can also be flow control operations, for an example limits that only allow a certain amount of elements to pass through or skip instructions that throw away a certain amount of elements before letting the rest through.

See FIG. 1 for an exemplary serial computer program. In this program, which performs a sequence of operations, a data structure "a" (e.g., a list, a table, a tree, a set, etc.) is accessed from a database. At least a part of the data structure "a" is mapped to another data structure "b," and then one or more of the records of the data structure "b" are selected according to one or more criteria. The records not meeting the criteria are excluded. Additional operations may be performed on the selected or filtered records. These additional operations may include one or more additional filtering/selecting operations, one or more mapping operations, and/or one or more modification operations. After the sequence of operations is completed, one or more records are selected in a terminating operation.

When the program is invoked, the terminal operation is first called upon. The terminal operation requests an element from the preceding operation, and that operation requests an element from its predecessor and so on until the source is reached. Then, the element is passed back through the pipeline, potentially modifying the data for each operation passed. The terminal operation continues to ask for elements until it has enough elements to be able to terminate or until the source has been completely emptied.

Figure 2:
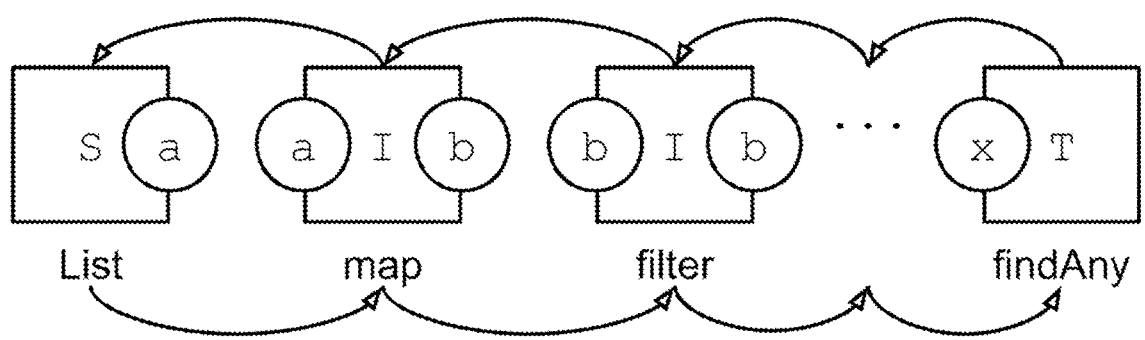
FIG. 2 illustrates the state of the art communication system from FIG. 1 and where data is pulled from the terminating operation via a pipeline from a data source.

See FIG. 2 for an exemplary flow of information elements. After accessing a database structure (e.g., a list, a set, a table, a tree, etc.), one or more map operations, one or more filter operations, and/or one or more modification (e.g., update, add, and/or delete operations) may be performed. FIG. 2 shows a map operation followed by a filter operation, but this is illustrative only. One or more filter operations can be followed by one or more map operations and/or one or more update operations, and map, filter, and update operations can follow one another.

Pipeline Analysis

In the following, a process (also called an algorithm) according to some embodiments is described. The process describes a method to parse a given set of operations before execution to determine which data will be required to complete the program before running it. This makes it possible to use external data, for an example a database on a remote host, as the source for a pipeline. This can reduce the time it takes to send data from the database to the application drastically since only the relevant data may need to be sent.

Figure 3:
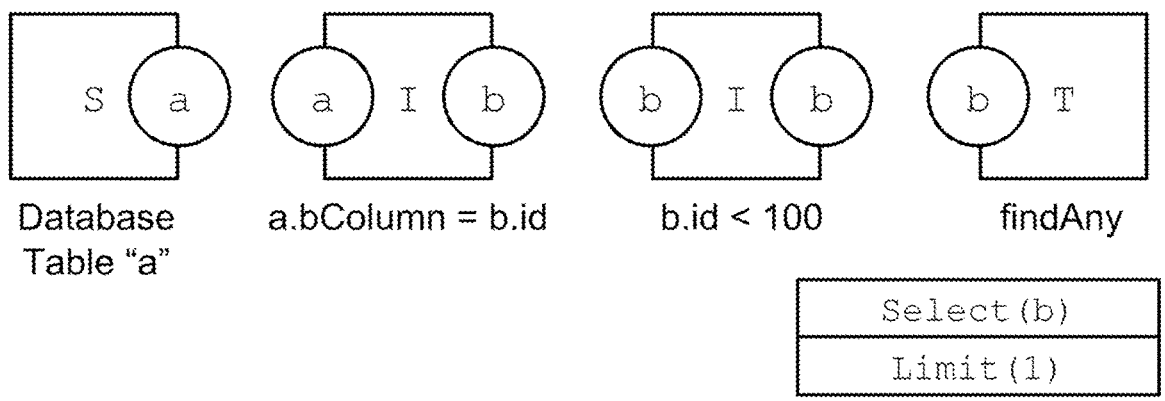
FIG. 3 illustrates the analysis of a list of operations on a data source according to one embodiment where the analysis starts at the terminating operation and progresses towards the data source, and where some properties of the terminating operation has been determined.

With reference to FIG. 3, in one embodiment, when the program is executed, the algorithm will start to look at the terminating operation to determine what data that is required for it to terminate. There are two variables we can get from this. The first is the type of data and the other is whether it is one or many instances that is expected. Given these two variables we create a builder object for that particular terminating operator. In the example illustrated with reference to FIG. 3, one record of the database element "b" is selected. In general, the database element can be any structure such as a table, an array, a list, a vector, a heap, a tree, etc. The termination operation is translated into a database commands "Select (b); Limit (1)," and these commands are included in the builder object of type select. The algorithm then goes to the preceding operation.

In particular, with reference to FIG. 3, in the first step a number of rows in table "a" (where the table "a" is of type A, for example) are selected. Then in the second step all instances of type A are mapped into a different type B in a table "b" so that there will be a corresponding flow of instances of type B. In the mapping process the field B.id depends on zero or more fields of the corresponding A instance. In some embodiments, the mapping may also depend on other external parameters. In the third step, only those B instances having an id field that is greater than 100 are propagated down the stream. In the last step, we select an arbitrary (e.g., the first, the last, a randomly selected, etc.) B instance that survived the filtering and that B is the result of the entire operation.

These steps can be described as an imperative program as follows:

```
// First step, source
for (i = 0; i < 100; i++) {
    a[i] = a_table.readNextTableRow( );
}
// Second step, mapping
for (i = 0; i < 100; i++) {
    b[i] = mapper.apply(a[i]);
}
// Third step, filtering
for (i = 0; i < 100; i++) {
    if (!(b[i].getId( ) > 100))
        b[i] = null; // Filter away those less or equal than 100
}
// Fourth step, terminating
for (i = 0; i < 100; i++) {
    if (b[i].getId( ) != null)
        return Optional.of(b[i]); // We found a B that was not filtered
}
return Optional.empty( ); // No B passed the filter
```

Figure 4:
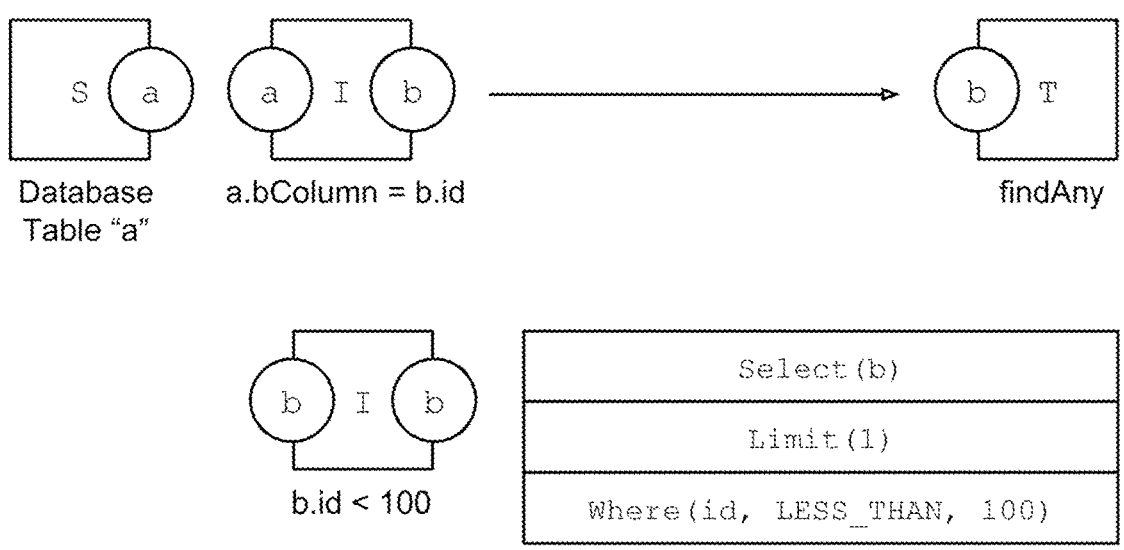
FIG. 4 illustrates the analysis of a list of operations according to FIG. 1, but where a second intermediate operation is consumed.

Now, as depicted in FIG. 4, when an intermediate operation is analyzed the algorithm tries to make the builder consume that operation. If there is enough data available about what the program is doing to fully replace it, the operation is removed from the pipeline and consumed by the builder. In the foregoing example, the selection of one record from the records of the database element "b" is limited to those records having an "id" value less than 100. This operation is translated into another database command (which is actually serves as a condition for another command) "Where (id, LESS THAN, 100)."

Figure 5:
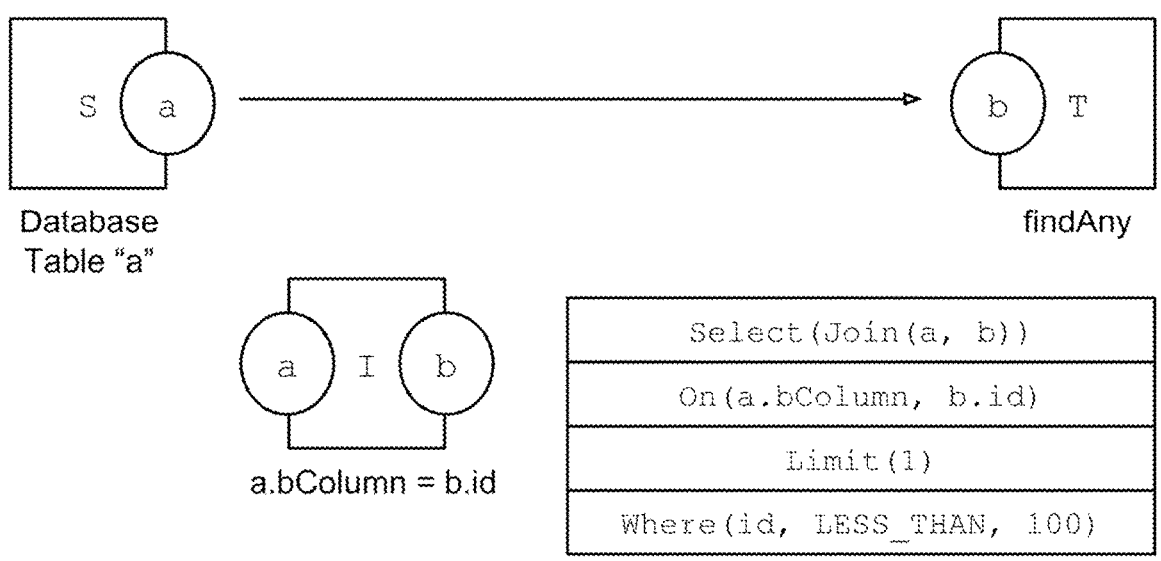
FIG. 5 illustrates the analysis of a list of operations according to FIG. 1, but where a third intermediate operation is consumed and the data source is reached.

Now, as depicted in FIG. 5, if an operation maps from one data type to another, the builder is replaced by another builder of the combined type. Here, the table "a" is mapped to table "b" as described above. This mapping can be translated into a database command (which may be integrated with another database command), "Join (a, b) on (a.bColumn, b.id). When the source of the pipeline is reached, the builder can be finished and used to produce a database query. To this end, all the database commands that were generated are included in the builder. The results of the query may then be sent down the stream to the remaining operators, or directly to the terminating operation if all operations were consumed.

In a conventional, programmatic implementation, the entire required database element(s) are accessed from the database(s) and then the specified operations are performed by a processor. In the foregoing example, in a conventional system, the table "a" would be accessed and the mapping, filtering, and selection operations would be performed by a processor, which is typically a remote processor. The table "a" could include a million records and only a hundred of these records may have an "id" value that is less than 100. Nevertheless, because the filtering is performed by a processor, all records may be transmitted to the processor in a conventional system.

In various embodiments described herein, a builder is constructed which includes database commands corresponding to the operations that were analyzed as described above. These database commands query the database and access only those portions of the complete records of one or more database elements that are required by the terminating operation. Generally, this number is smaller than the total number of records in the one or more database elements processed by the specified operations.

In the foregoing example, the terminating operation requires only one record where the "id" is less than 100 and, only one such records may be transmitted from the database to the processor, for subsequent use thereof. Note that the data stream accessed using the builder described in FIGS. 3-5 is much more efficient because with this data stream the processor does not have to evaluate all As and Bs as a processor executing an imperative algorithm would need to. If the first B passes the filter, only one A is ever read from the database. In other cases, more than one records may be transmitted but, in general, the number of records that need to be exchanged back and forth between a processor and a database can be minimized by using a builder that includes database commands corresponding to the analyzed operations that are specified in a program. With streams generated according to various embodiments, the objects are pulled into the pipeline as needed.

Figure 6:
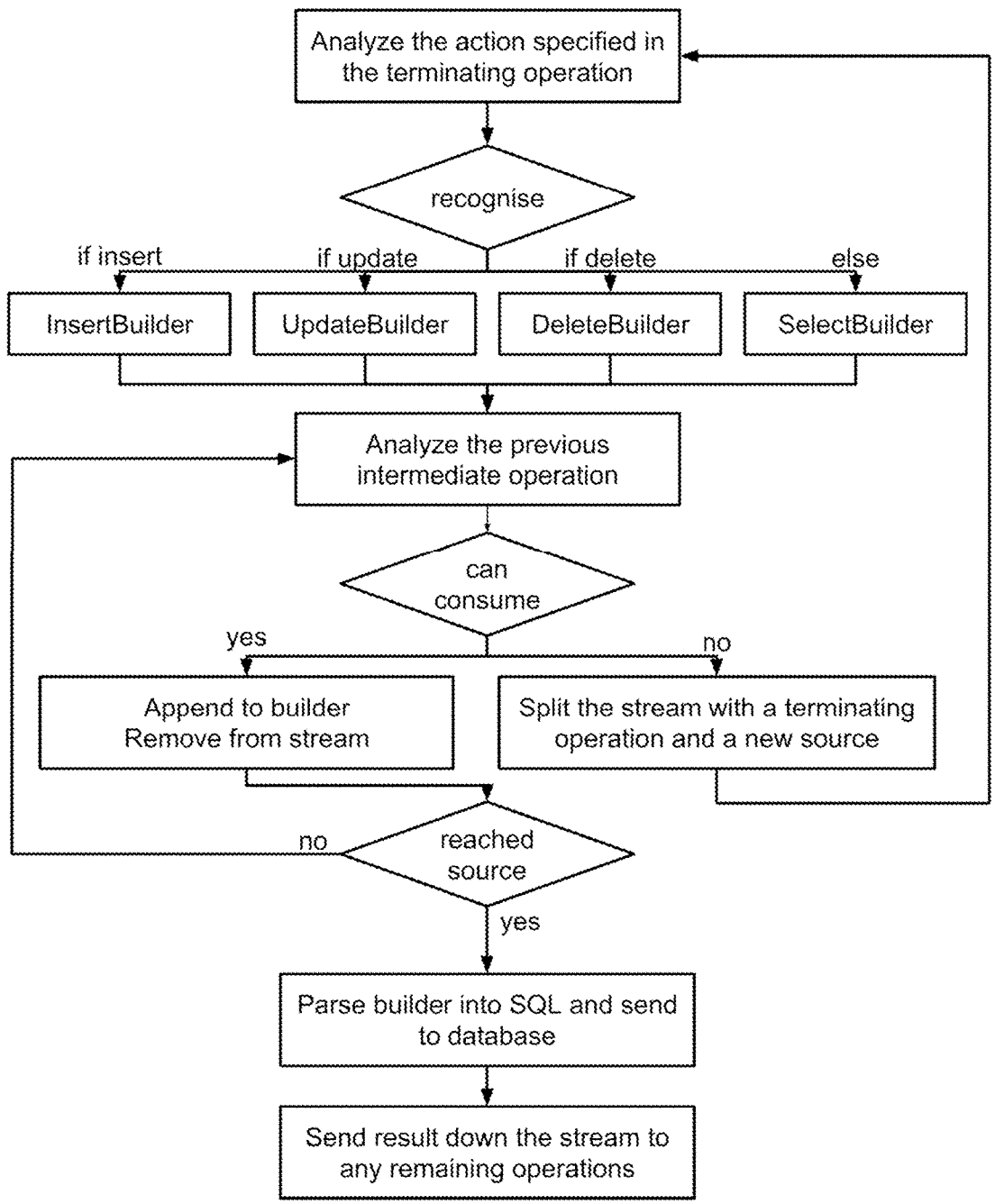
FIG. 6 illustrates a flow chart of a process according to various embodiments.

As depicted in FIG. 6, in a translation process, a sequence of operations (also called a pipeline) associated with one or more database elements, where the sequence is described using a programming language, is received. The programming language can be Ada, BASIC, C, C++, C#, Clojure, D, Erlang, Haskel, Java Script, Kotlin, PHP, Visual BASIC, and/or any other programming language. The terminating operation of the pipeline is identified and the action performed by the terminating operation is analyzed. This terminating operations is also called the original terminating operation.

If the action is recognized as an insert operation, where one or more new records may be created and added to one or more database elements, a builder of type "insert" is created. If the action is recognized as an update operation, where the values of one or more records of one or more database elements may be modified, a builder of type "update" is created. If the action is recognized as a delete operation, where one or more records of one or more database elements may be deleted, a builder of type "delete" is created. Otherwise, a builder of type "select" is created. Correspondingly, a database access command of type "insert," "update," "delete," or "select" is included in the builder. The database access command generally depends on the type of the database to be accessed. The database can be an SQL database such as Apache Derby™, Amazon Aurora™, IBM DB2™, Hadoop™, SAP Sybase IQ™, etc., or a NoSQL database.

An operation preceding the terminating operation (where such preceding operation can also be called an intermediate operation) is then analyzed. Common types of intermediate operations include filtering operations, mapping operations, and operations that modify the values of one or more records of one or more database elements. The filtering operations may include selecting one or more records based on the success or failure of a condition such as comparing the values of respective particular components of records with a specified value. The mapping operation generally includes specifying records of one type or portions of records of one type as records of another type. Operations that modify the values of one or more records may include increasing or decreasing the values, setting or resetting the values, etc.

If the action specified in the preceding operation can be analyzed, the operation is recognized as consumable. That action is then translated into a modification of a database command, such as the initially generated database access command corresponding to the terminating operation, and or a command modified according to one or more intermediate operations. The modification can serve as a condition used by another command. The builder is modified to include the modified or updated database access command and the preceding operation may be removed from the pipeline. Thereafter, the next preceding operation is processed as described above, until the database source is reached. At that time, a database query is assembled using the updated database access command included in the builder. The query is typically an SQL query because SQL databases are commonly used but can also be a NoSQL query.

In some cases, the action performed by a preceding operation (e.g., an intermediate operation) is not analyzable. In that case, that operation is considered to be a new terminating operation and the result of that operation is treated as a new data source for the downstream operations that were analyzed before and for which a builder was constructed. The initially created builder would generally be the compound of the original terminating operation and all removed intermediate operations. A new builder of type select is generated for the new terminating operation and the process described above is repeated.

A database query is assembled using the database command included in the initially created builder, and that query is applied to the new data source, which would be the output of the new builder. A database query assembled using the database command included in the new builder may be provided to the database. In general, the result of that query may be provided to the first terminating operation in the pipeline, which can be a newly created terminating operation or the original terminating operation. If the terminating operation is a newly created one, another database query based on the next builder is applied thereto and, the result of that query is transmitted to the next terminating operation in the pipeline, which can be another newly created terminating operation or the original terminating operation.

Figure 7:
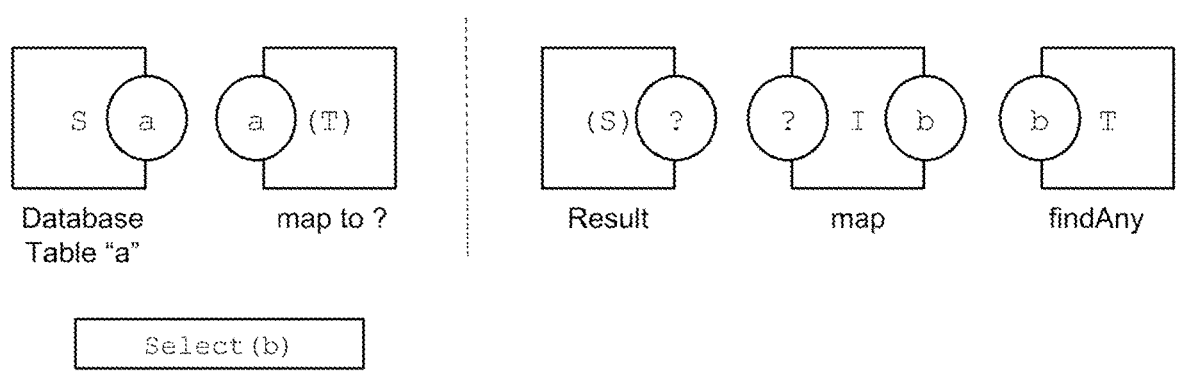
FIG. 7 illustrates the analysis of a list of operations on a data source where an intermediate operation cannot be consumed directly by a builder, according to some embodiments.

As depicted in FIG. 7, if the there are intermediate operations that cannot be consumed, another flow of actions are taken. If an intermediate operation cannot be consumed because the implementation is not recognized, the pipeline will be broken into two parts at this point, where the intermediate operation is now considered a terminating operation for the remaining pipeline and the result from it is considered a source for the already parsed part. A builder of type Select is used for the newly created terminating operation, the implementation of which was not recognized. When the source is reached, the current builder will be parsed into SQL and sent to the database. The result will then be parsed by the rest of the stream as described above.

Figure 8:
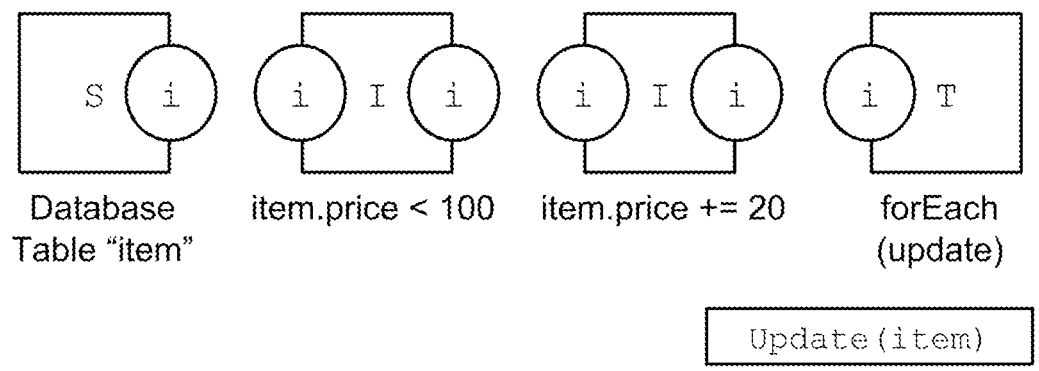
FIG. 8 illustrates the analysis of a list of operations on a data source according to some embodiments, where the terminating operation changes the state of the database.
Figure 9:
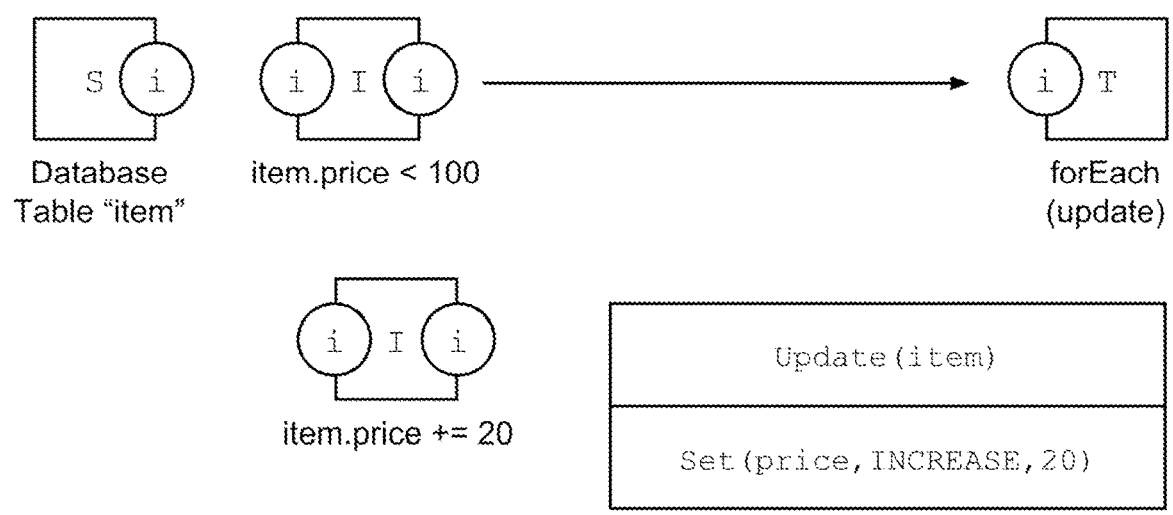
FIG. 9 illustrates the analysis of a list of operations on a data source where the terminating operation changes the state of the database and where a first intermediate operation is consumed by a builder, according to one embodiment.

As depicted in FIGS. 8 and 9, if an intermediate operation changes the state of the entities passing through it, these changes must also be reflected back to the database. When a changing terminating action is recognized, a special updating builder will be created. When the preceding intermediate operation is reached, it is recognized as an operation that changes the state of elements passing through it, increasing the price of each item by 20. Since the terminating action can consume changing operations, it can safely be removed from the stream. As depicted in FIG. 9, The next intermediate operation is a filter that only let items with a price lower than 100 through. It can also be consumed by the terminating action and can therefore be removed from the stream.

Figure 10:
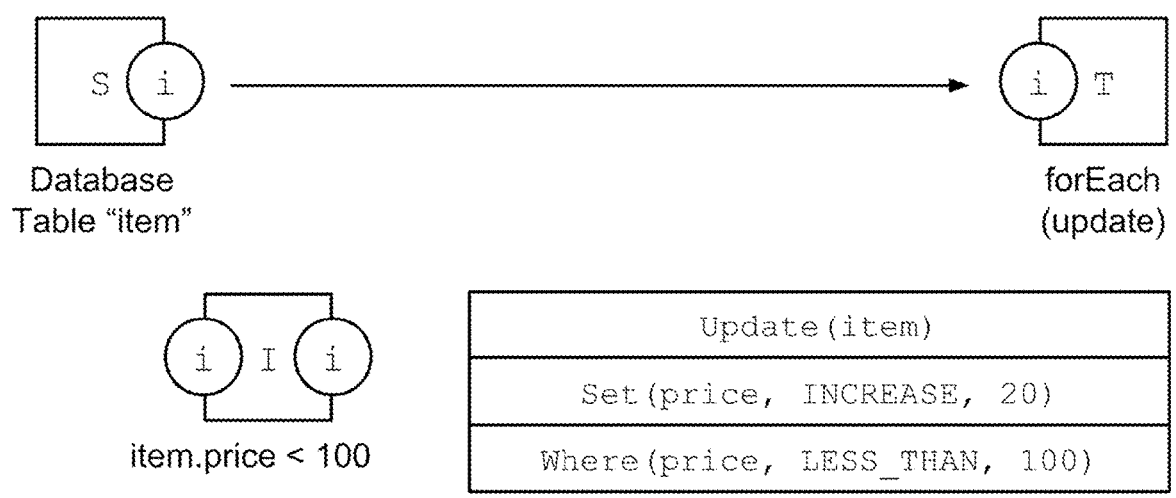
FIG. 10 illustrates the analysis of a list of operations on a data source according to FIG. 9 but where also a second intermediate operation is consumed by a builder, according to one embodiment.

As depicted in FIG. 10, when the source of the pipeline is reached, the transaction will be built and sent to the database. This time the application does not have to wait for a response as the update operation does not require to actually see the elements that have been changed but can terminate early. Assume that the table "item" is NOT in a processor's local memory. In a conventional system that does not have the builder described herein, it would be necessary to make a local copy of the entire table "item," selectively update the prices of items that have prices less than 100, and then transfer the entire local copy back to the database.

Suppose the table "item" has 1,000 records but only 50 of those items have price less than 100. The above transfers can be made efficient by copying to the processor's local memory only those 50 items that have prices less than 100, updating those prices, and then writing only the updated 50 items back to the database. The "Update" builder uses the Set database command with INCRESE, and avoids the back and forth transfers of even the 50 items that initially had prices less than 100. As such, builders according to various embodiments can minimize or even completely eliminate data transfers between a server that stores the database and a client processor that consumes the data. As such, in various embodiments client side pipelines can be operated partially or entirely at the server side, minimizing the data transfers therebetween, which can increase performance of the overall system e.g., by one or more of: minimizing the processing time, minimizing the processing cost in terms of memory and processing resources required, and/or minimizing energy/power consumed during the processing.

Figure 11:
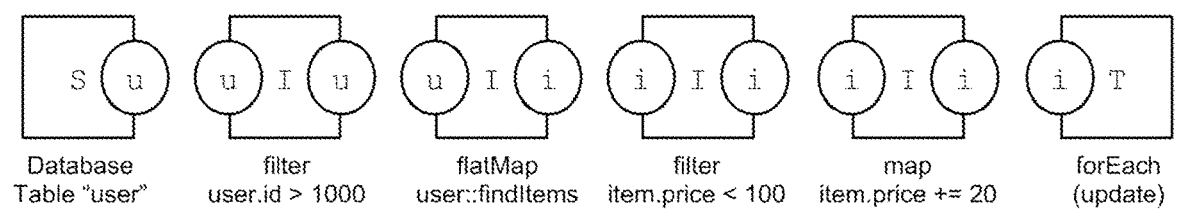
FIG. 11 illustrates the analysis of a list of operations on a data source where several tables needs to be joined, according to some embodiments.
Figure 12:
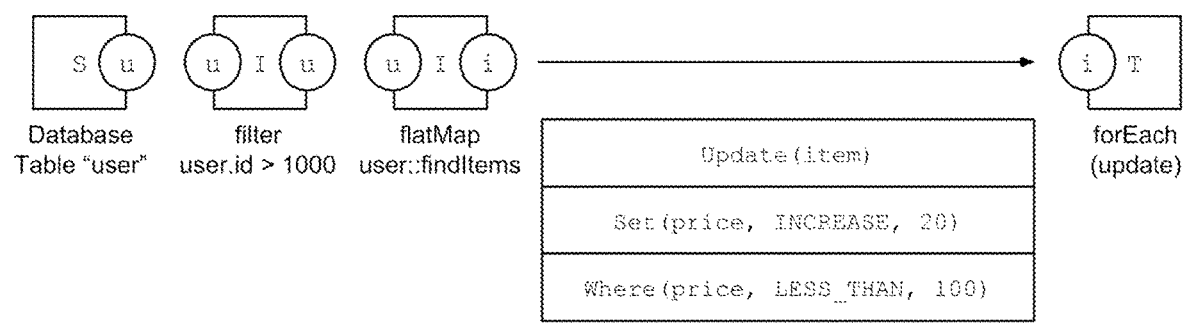
FIG. 12 illustrates the analysis of a list of operations on a data source according to FIG. 11 but where a second intermediate operation has been consumed by a builder, according to some embodiments.

As can be seen in FIG. 11, in a more advanced user case a change to the database might span over multiple tables. In this example the program filters out the users that have an id over 1000, finds the items that are owned by those users and if the item price is less than 100, increase it by 20. The first steps of the algorithm are generally the same as in the previous example. The terminating operation is recognized as an update, the operation before it as a changing operation and the one before that as a filtering. When these three have been parsed, the builder may look like the one in FIG. 12.

Figure 13:
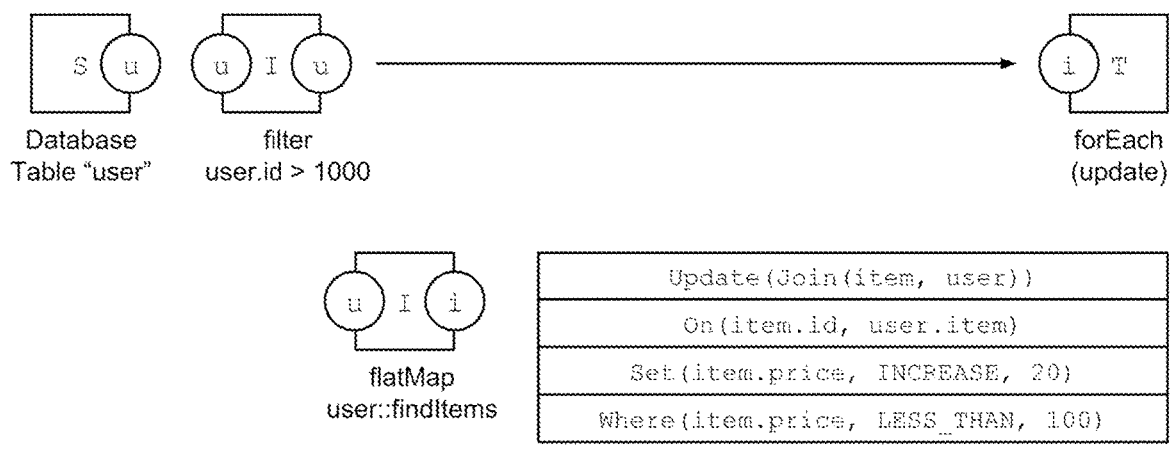
FIG. 13 illustrates the analysis of a list of operations on a data source according to FIG. 12 but where a third joining intermediate operation has been consumed by a builder, according to some embodiments.

As can be seen in FIG. 13, When the next intermediate operation is reached, it is recognized as a path in the entity graph that will require a join-statement to be consumed. It's signature matches a join between the "user" and the "item" column on the "id" column, so a new builder is constructed on that joined table with the details from the last builder. The expected type is also set to "user" instead of "item" when the rest of the stream is parsed.

Figure 14:
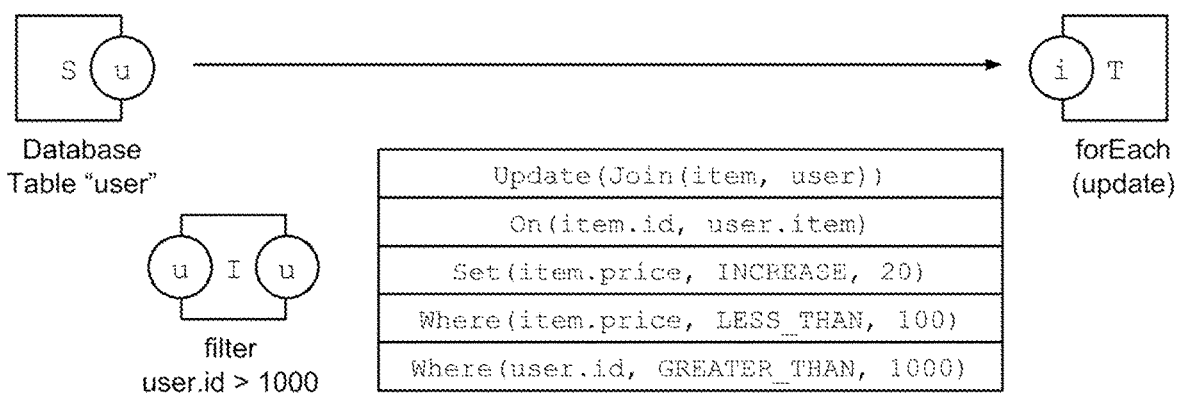
FIG. 14 illustrates the analysis of a list of operations on a data source according to FIG. 13 but where a fourth intermediate operation has been consumed by a builder and a data source has been reached, according to some embodiments.

As can be seen in FIG. 14, The next intermediate operation is another filter, but this time on the user table. Since our builder is currently a joined builder between the user and the item table, this is no problem but can safely be consumed. The source of the stream is now reached and the builder can be parsed into SQL to be sent to the database.

Figure 15:
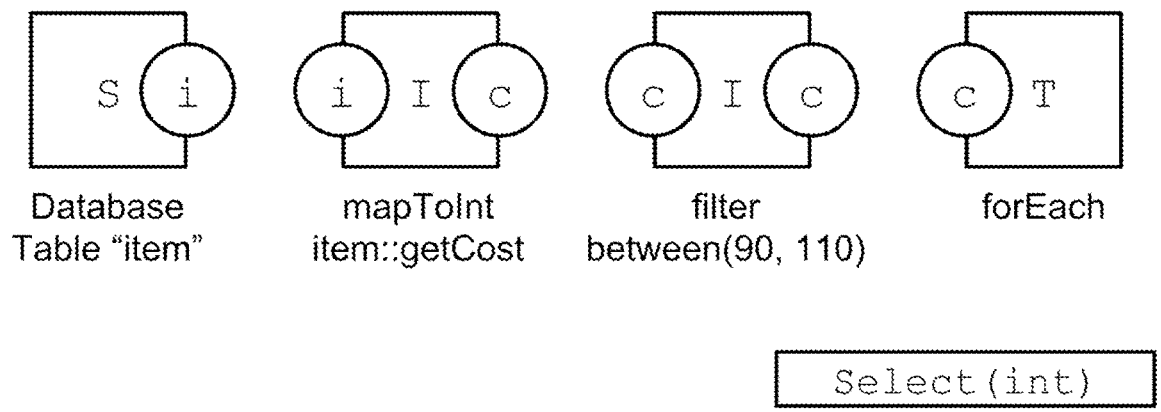
FIG. 15 illustrates the analysis of a list of operations on a data source whereby the terminating operation operates on a scalar value, according to some embodiments.
Figure 16:
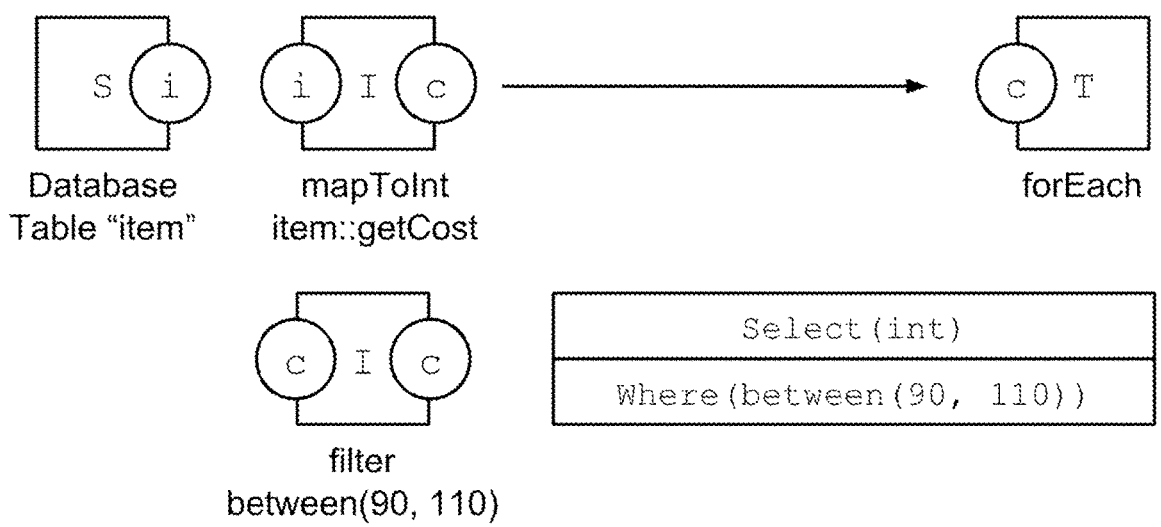
FIG. 16 illustrates the analysis of a list of operations on a data source according to FIG. 15 but where a first intermediate operation has been consumed by a builder, according to some embodiments.

With reference to FIG. 15, Just as an entire row can be selected, specific columns can also be used in the pipeline. If the terminating operation is not consuming whole entities but single values, a primitive select terminator is created. According to FIG. 16, The preceding intermediate operation is a filter that only includes values between 90 and 110. This operation can be consumed by the builder, so it is removed from the pipeline and added to the builder.

Figure 17:
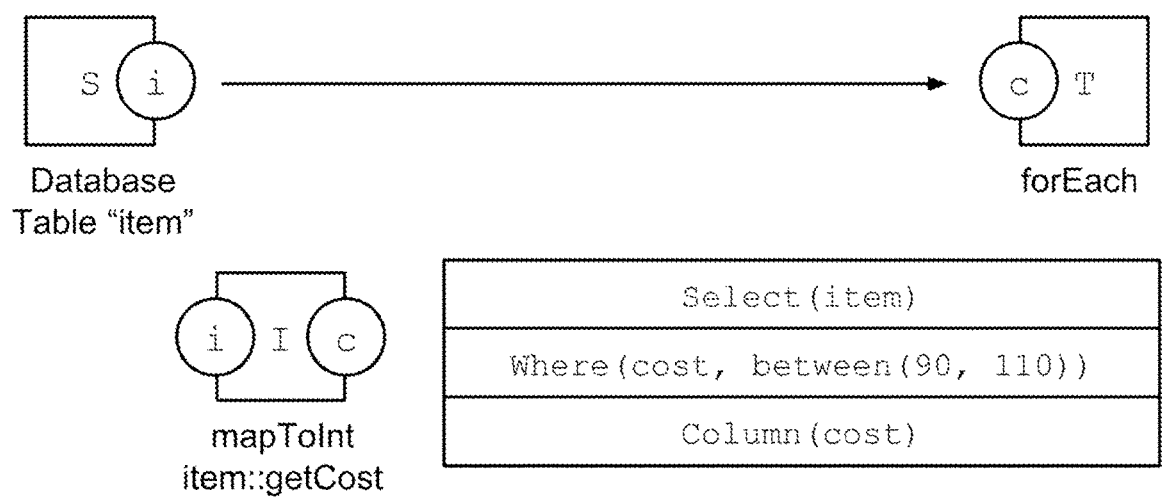
FIG. 17 illustrates the analysis of a list of operations on a data source according to FIG. 16 but where a second intermediate operation has been consumed by a builder and the data source has been reached, according to some embodiments.
Figure 18:
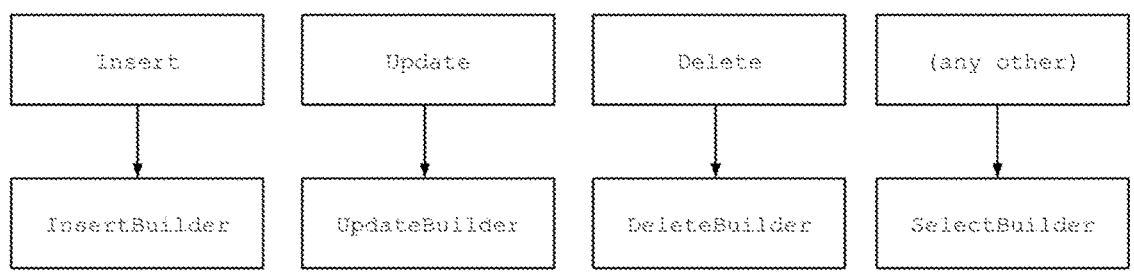
FIG. 18 illustrates a set of different builders, according to various embodiments.

According to FIG. 17, When the intermediate operation mapToInt is parsed, the database entity "item" is recognized as the input type and the method getCost is recognized as a getter on the cost column. The builder is therefore replaced by a builder for the item table, but with an additional modifier to only load the cost column. When the source is reached, the builder will be built into a SQL statement and sent to the database. The result will be loaded as a series of primitive int values when sent to the terminating operation The Builder The first step of the algorithm is to determine which builder to use for representing the action that is to be performed. In some embodiments, there are four different types of builders. The insert, update, delete and the select builders. The first three are recognized using the object that is passed to the terminating action. If it is an Update-object, that means that it is an UpdateBuilder that will be created. If an object is passed to the terminating action that is not an insert, update or delete, a SelectBuilder will be created. FIG. 18 illustrate how the mappings work.

Each builder implements an interface that allows a number of different modifiers to be applied to them. Each builder also has a resulting type that will be used to produce the object from the database result that the terminating operation is expecting. The modifiers that are available are these: On, Set, Where, Column, Skip, Limit.

The On modifier, takes two fields from two different entities that are supposed to have the same value for a join to be resolved. This is typically used when joining two tables on a foreign key using a "map" or a "flatMap" intermediate operation. The Set modifier takes a field, a modifying operator and either a constant value or an expression. This is used in both insert and update statements to set the new values of the affected rows.

The Where modifier takes a field, a comparison operator and either a constant value or an expression. This is used to specify which elements should be affected by the statement and will result in a WHERE statement in the final SQL string. The Column modifier takes a single field. Specifies that a particular column should be included in the result of the "select" operation. This is useful for reducing the amount of data being sent over the network. If no column modifiers are specified, every column value will be sent. The Skip modifier takes a number for how many elements should be ignored. The Limit modifier takes a number for how many elements should as most be included in the result.

Rendering the Query Model into SQL

When the source of the pipeline is reached, the builder must be parsed into an executable SQL string before being sent to the database manager. There are multiple implementations of the builder interface, one for selecting operations, one for updating operations, one for deleting operations and one for inserting operations. The implementation of the builder determines how the different modifiers attached to it should be interpreted. For an example, the builder from the "joining multiple tables" example above will produce the following SQL string if the MySQL database is used as depicted in FIG. 19.

Other Pipeline Analysis Methods

In other embodiments, the entire table is selected as source. In yet other embodiments, a simpler mapper is used where the analysis is started by the terminating operation but where the pipeline is examined from the source downwards towards the terminating operation. This analysis allows filter( ) operations immediately following the source to be used as input when rendering SQL where statements, where two or more filter( ) predicates will correspond to SQL Boolean expressions separated with the SQL 'AND' statement.

EXAMPLES

In the following examples of how the stream API in Java 8™ can be analyzed as a functional program pipeline and parsed into SQL according to several embodiments will be shown. First is a description of how the example database is structured and then follows a table with numbered code examples.

Exemplary table "item" has columns; id(int) that is a primary key, user(int) that is a foreign key to the table "user"'s column "id" and price(int)

Exemplary table "user" has column; id(int) that is a primary key, name(varchar) and age(int).

In the following, the variable 'users' corresponds to an abstraction of all the users in the user table and the variable 'items' corresponds to an abstraction of all the items in the item table. They both implement a Manager interface.

Selecting Items from a SQL Database

Table 1 in FIGS. 20A-20C shows that according to some embodiments, the following mappings can be done when selecting items from a SQL database. In the examples the wildcard (*) is used but in the real implementation the explicit column names should be used instead. There are several variants of JOINs and they can be selected depending on what is most efficient.

Note on Item #16: Because we can retrieve any row that fulfills the requirements of the pipeline, the sort( )ORDER BY operation can be safely removed. If there were limit( ) operations with a limit greater or equal than 1, those can be removed too.

Note on Item #21: For databases supporting the MULTISET command there is a more efficient mapping where the user data columns are not repeated for each item. SELECT user.*, MULTISET (SELECT item.* FROM item WHERE item.user=user.id) AS item FROM user 'user'.'id'>4.

In the examples shown in Table 1, one option, generally implemented by a conventional system, is to access the entire data stream from the database and then perform one or more operations on the data stream. This could be inefficient in terms of data transfers (required bandwidth, access delay, etc.). Alternatively, according to various embodiments described herein, the SQL query is formed by analyzing the operations so that the amount of data transferred to and from a remote database can be minimized.

This may allow the developers to work in just one programming language (e.g. Java™, C++, etc.) and still benefit from server side operations which otherwise would require the developers to work with two languages (e.g. a programming language and a database command language). Another advantage is that since streams can be expressed independently from the source type (e.g. the database) it is possible to pull in data from either a database or some other optimized store such as an in-memory store. The developer can use exactly the same stream syntax but the builders can render the stream either to SQL or to NoSQL, e.g., instructions to retrieve and/or update data directly from memory.

Creating Items in a SQL Database

Table 2 in FIG. 21 shows that according to some embodiments the following mappings can be done when creating items in a SQL database. Note on Item #103: The createNewUsers( ) method creates a collection of new users. In some embodiments, several inserts can be grouped together into a single insert statement to increase database performance. If there are many objects to be inserted into the database, the maximum length of a SQL command may be reached. In such cases, several inserts may be used within a compound transaction. When the inserts are made in a single transaction, any ordering of the source may me discarded.

Updating Items in a SQL Database

Table 3 in FIG. 22 shows that according to some embodiments the following mappings can be done when updating items in a SQL database.

Deleting Items from a SQL Database

Table 4 in FIG. 23 shows that according to some embodiments the following mappings can be done when deleting items from a SQL database.

Database Domain Parameters

Database Domain Parameters (hereafter DDP) includes one or several parameters that are related to the database and its structure. DDPs includes, but are not limited to; database name, schema name, catalog name, SID, table (name, collation), view (name, collation), column (name, ordinal position, type, nullable, collation), index (name, ordinal position, column list), foreign key (name, ordinal position, foreign key table, foreign key column, column).

In the following, determination of operations and their related Database Domain Parameters will be described. In some embodiments, it is sometimes necessary to relate operations (for example a Predicate in a filter) to one or several DDPs. Some languages support such a relation whereas some do not. For example, Java does not provide a mapping from an object's getter (e.g. user.getId( )) to the actual field (e.g. int id). However, according to various embodiments, there are many ways to obtain this mapping, should it not be available directly.

De-compilation: Predicates, getters, setters, finders, comparators and other objects that can be used by streams, can be decompiled to determine one or several DDPs. For example the predicate (User u)->u.getId( ) may be decompiled to reveal that the entity User is used (implying the use of the table 'user') and that the field id is used within the User object (implying the use of the column 'id' for the table 'user'. In some embodiments, such de-compilation only has to occur once, because the outcome would always be the same for the same input object.

Method References: Method references can be used as predicates, getters, setters, finders, comparators and other objects that can be used by streams. Method references remain the same during the application's lifecycle and it is possible to detect such references using an identity function check (e.g. if an object has the same reference or "address" then in fact, the methods are identical). In some embodiments, such potential references are analyzed ahead of run time (e.g. during bean generation and/or compilation) whereby their corresponding DDPs are stored for later retrieval.

Reflection: It is possible to analyze predicates, getters, setters, finders, comparators and other objects that can be used by streams using reflection. In some embodiments, reflection is used to extract Database Domain Parameters from these objects.

Support Fields: It is possible to introduce builders or pre-defined objects for predicates, getters, setters, finders, comparators and other objects that can be used by streams. These builders can be related to beans either by inclusion in the beans SPE-003 Drawings for Provisional Application themselves or by inclusion elsewhere in the code. In some embodiments, such builders and/or predefined objects can carry one or several information elements pertaining to their relation to one or several Database Domain Parameters.

Annotations: In some embodiments, Beans are annotated, for example using the JPA standard to indicate one or several DDPs. In some embodiments, the JPA standard annotations: @Entity, @Column, @Table, @Id, are used. There are other persistence standards and persons skilled in the art would easily realize that other corresponding or equivalent annotations can be used as well.

Combination of different methods to extract DDP: In some embodiments, two or more means of obtaining DDPs are combined to retrieve DDPs. Any combination of the actions; De-compilation, Method Reference, Reflection, Support Field and Annotations may be used. In one embodiment, the Comparator argument to the sort( ) method, is checked if it is a Comparator returned by the standard library function Comparator.comparing( ). This object is known and its parameters can be analyzed using reflection. Using Method reference identity check, the field name can be retrieved and the object field can be retrieved. Annotations from this field can finally reveal the DDP table and column. It shall be noted that a combination of the actions listed in this clause can be included in the compound combination zero or more times. As an example, a compound combination might consist of the actions Reflection, De-compilation, Reflection, Reflection and Method Reference Combinatorial Variants: It shall be noted that the order in which the stream operations appear in examples shown for various embodiments is exemplary. There are many other valid combinations that various embodiments can handle. In fact, the combinatorial variants quickly approaches infinity and because of that, all combinations can not be shown herein.

Other Aspects

Optimizations: For some types of Terminating Operations, it is possible to optimize away one or several steps of the pipeline. For example, it can be shown that the pipeline "users.stream( ).filter(u->u.getId( )4).map( ).sorted( ).count( )" is equivalent to the pipeline "users.stream( ).filter(u->u.getId( )4).count( )". Because the intermediate operations, map( ) and count( ) does not affect the number of items that will be counted by the terminating operation. Thus is it possible to translate the first pipeline to the following SQL code "select count(*) from user where id>3;"

Any intermediate operations that does not affect the number of items can be dropped provided that there are no other operations in between these operations and the terminating operation.

Parallelism: One of the current trends within the IT industry is that the number of threads and/or CPU cores are increasing rather than the performance of each thread/core. The stream API allows for seamless parallelization of queries.

According to one embodiment, the ResultSet (or equivalent) is read by a single thread, but are then feed into a parallel stream to a plurality of threads. This will lead to better performance if the time to read from the database is small compared to the time it takes to process the stream elements.

In another embodiment, a single query is split into a plurality of queries that, in turn, returns a plurality of result sets from the database. These ResultSets (or equivalent) are subsequently processed by several threads within a Stream. In some embodiments, a parallel partition key function is provided to the initial stream, denoting how the stream is to be parallelized. In yet another embodiment, where there is at least one column that is numerical (preferably but not necessarily a primary key), the ResultSets are partitioned using a modulo function stream#=field % (number of threads).

For example, if there is a table "user" with an auto_increment field id that is automatically set to 1, 2, 3, . . . N for each user as the users are inserted in the database, then there will be N users with id 1, 2, 3, 4.

the call: "user.stream( ).parallel( ).forEach(doOperation( ))" can be rendered to several SQL sub-queries: can be rendered to several SQL sub-queries: "start transaction; select * from user where (id % N=0); select * from user where (id % N=1); . . . ; select * from user where (id % N=(N−1)); commit;

where a selected level of parallelism is N (e.g. there are N execution threads). Each sub-query ResultSet will subsequently be handled by a separate thread, where the separate N threads are combined to an aggregate parallel Stream. In some embodiments, the combined Stream is composed of several sub-stream and/or Spliterator each corresponding to its associated sub-query. In some embodiments, the sub-queries are executed in the same transaction, as shown above, guaranteeing a consistent parallel view of the table. In another embodiment, transactions may be skipped and traded for performance.

In a more complex example, the call the pipeline "user.stream ( ).parallel ( ).filter (User.ID.greaterThen (10)).forEach (doOperation ( ))" can be rendered to several SQL sub-queries: "start transaction; select * from user where (id>10) AND (id % N=0); select * from user where (id>10) AND (id % N=1); select * from user where (id>10) AND (id % N=(N−1)); commit;" for thread 1,2 . . . N. Those skilled in the art would generally understand that parallelization can be combined with other aspects and with different embodiments.

Caching: As described in US 2014/0149365, which is incorporated herein by reference in its entirety, it is possible to detect changes in a database. According to some embodiments, such change events can be made available to an application using subscriptions and/or listeners. In some embodiments, changes in a database are made available using standard Java Streams 8. Several embodiments are in no event limited to Java. In fact, equivalent solutions may be implemented in other languages by those skilled in the art.

In one embodiment, changes to the database may be made available to the application as shown here "

```
Map<Integer, User> concurrentMapWithChangedUsersWithIdOver4 =
    users.subscribe( )
        .filter(User.ID.greaterThan(4))
        .collect(
            Collectors.toConcurrentMap(
                User::getId,
                Function.identity( ))
    );
```

This can produce a concurrent map that is constantly updated when the database is updated by any application and where the user id is greater than 4. In different embodiments, a scheme with a listener can be implemented as shown hereunder:

```
Consumer<User>  listener  =  System.out::println;  //
Exemplary listener
users.subscribe( ).forEach(listener);
```

Recyclable Streams: In the SQL programming model, it is possible to use Prepared Statements, which are reusable statements with better performance if they are used many times. They only need to be compiled once and then they may be invoked a plurality of times.

In some embodiments, the streams can be reused (or recycled) a plurality of times. In some embodiments, state full intermediate operations are replaced with new ones upon each re-entry of the stream, whereas stateless intermediate operations can be retained and applied over and over. This means that the analysis of the pipeline must only be made one time. This can improve performance.

In another embodiment, a builder is used to build the stream pipeline once and for all including the terminal operation. After the builder's build method is called and/or when a terminal operation is called, a Supplier is returned that repeatedly can call the same pipeline, potentially improving performance if the same pipeline is called repeatedly.

In some embodiments, a recyclable stream may take the following appearance:

```
Supplier<IntSummaryStatistics> recyclableStream =
    users.recyclableStream( )
        .filter(User.ID.greaterThan(1))
        .mapToInt(User::getAge)
        .summaryStatistics( );
// First call
IntSummaryStatistics res1 = recyclableStream.get( );
// Later in the code a second call to the same stream
pipeline
IntSummaryStatistics res2 = recyclableStream.get();
```

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for translating a sequence of operations described using a generalized programming language into database access commands in a database access language, the method comprising performing by a processor, prior to execution of the sequence of operations by the processor, the steps of:

generating an initial builder corresponding to an original terminating operation in the sequence of operations, the initial builder comprising an initial database access command accessing a database and corresponding to the original terminating operation, the original termination operation being identified by parsing the sequence of operations;

determining whether a first intermediate operation within the sequence of operations and immediately preceding the original terminating operation, identified by parsing the sequence of operations, is translatable into a modified database access command that corresponds to the initial database access command and the first intermediate operation;

if the first intermediate operation is translatable, updating the initial builder by modifying the initial database access command according to the first intermediate operation into a modified database access command; and otherwise, partitioning the sequence of operations into a first subsequence comprising the original terminating operation and a second subsequence comprising the first intermediate operation designated as a new terminating operation.

2. The method of claim 1, further comprising:
updating the sequence of operations by removing therefrom the first intermediate operation.

3. The method of claim 1, wherein the first intermediate operation is not translatable, the method further comprising:
generating a new builder corresponding to the new terminating operation, the new builder comprising a new initial database access command corresponding to the new terminating operation;
determining whether an intermediate operation in the second subsequence is translatable into a new modified database access command that corresponds to the new initial database access command and the intermediate operation in the second subsequence;
if the intermediate operation in the second subsequence is translatable, updating the new builder by modifying the new initial database access command according to the intermediate operation in the second subsequence into a new modified database access command; and
otherwise, partitioning the second subsequence into a first sub-subsequence comprising the new terminating operation and a second sub-subsequence comprising the intermediate operation in the second subsequence designated as another terminating operation.

4. The method of claim 3, further comprising:
configuring an output of the new builder as a source to a query corresponding to the initial builder.

5. The method of claim 3, further comprising:
sending a query corresponding to the new builder to a database.

6. The method of claim 1, further comprising:
determining that a second intermediate operation is translatable into a further modified database access command that corresponds to the modified database access command and the second intermediate operation; and
updating the initial builder by further modifying the modified database access command according to the second intermediate operation into a further modified database access command.

7. The method of claim 1, further comprising:
determining that a source of the sequence is reached; and
sending a query corresponding to the initial builder to a database.

8. The method of claim 1, wherein the database comprises at least one of a structured query language (SQL) database and a non-structured query language (NoSQL) database.

9. The method of claim 1, wherein the initial builder comprises at least one of an insert builder, an update builder, a delete builder, and a select builder.

10. The method of claim 1, wherein:
the first intermediate operation comprises a mapping of a first database element onto a second database element; and
the modified database access command comprises a join associated with both the first and second database elements.

11. The method of claim 1, wherein:
the first intermediate operation comprises a filtering of a first database element based on a condition; and
the modified database access command comprises a selection of a subset of records of the first database element based on the condition.

12. The method of claim 1, wherein:
the first intermediate operation comprises updating a first database element according to a parameter; and
the modified database access command comprises a modification of at least a part of a record of the first database element according to the parameter.

13. The method of claim 12, wherein:
updating the first database element comprises adding a new record to the first database element; and
the modification of at least a part of the record of the first database element comprises inserting the new record into the first database element.

14. The method of claim 1, wherein:
a number of records to be transferred from a database to a processor executing the sequence of operations is greater than a number of records accessed via the initial database access command.

15. A system for translating a sequence of operations described using a generalized programming language into database access commands in a database access language, comprising:
a first processor; and
a first memory in communication with the first processor, the first memory comprising instructions which, when executed by a processing unit comprising at least one of the first processor and a second processor, the processing unit being in communication with a memory module comprising at least one of the first memory and a second memory, program the processing unit to, prior to execution of the sequence of operations by the processor:
generate an initial builder corresponding to an original terminating operation in the sequence of operations, the initial builder comprising an initial database access command accessing a database and corresponding to the original terminating operation, wherein the instructions program the processor to parse the sequence of operations to identify the original terminating operation;
determine whether a first intermediate operation within the sequence of operations and immediately preceding the original terminating operation, identified by parsing the sequence of operations, is translatable into a modified database access command that corresponds to the initial database access command and the first intermediate operation;
if the first intermediate operation is determined to be translatable, update the initial builder by modifying the initial database access command according to the first intermediate operation into a modified database access command; and
otherwise, partition the sequence of operations into a first subsequence comprising the original terminating operation and a second subsequence comprising the first intermediate operation designated as a new terminating operation.

16. The system of claim 15, wherein the instructions further program the processing unit to:
update the sequence of operations by removing therefrom the first intermediate operation.

17. The system of claim 15, wherein the first intermediate operation is not translatable, and the instructions further program the processing unit to:
generate a new builder corresponding to the new terminating operation, the new builder comprising a new initial database access command corresponding to the new terminating operation;

determine whether an intermediate operation in the second subsequence is translatable into a new modified database access command that corresponds to the new initial database access command and the intermediate operation in the second subsequence;

if the intermediate operation in the second subsequence is determined to be translatable, update the new builder by modifying the new initial database access command according to the intermediate operation in the second subsequence into a new modified database access command; and otherwise, partition the second subsequence into a first sub-subsequence comprising the new terminating operation and a second sub-subsequence comprising the intermediate operation in the second subsequence designated as another terminating operation.

18. The system of claim 17, wherein the instructions further program the processing unit to:

configure an output of the new builder as a source to a query corresponding to the initial builder.

19. The system of claim 17, wherein the instructions further program the processing unit to:

send a query corresponding to the new builder to a database.

20. The system of claim 15, wherein the instructions further program the processing unit to:

determine that a second intermediate operation is translatable into a further modified database access command that corresponds to the modified database access command and the second intermediate operation; and update the initial builder by further modifying the modified database access command according to the second intermediate operation into a further modified database access command.

\* \* \* \* \*